United States Patent
Callanan et al.

(10) Patent No.: US 12,242,411 B2
(45) Date of Patent: Mar. 4, 2025

(54) ENHANCED SAFETY MECHANISM FOR SINGLE WIRE INTERFACE

(71) Applicant: Analog Devices International Unlimited Company, Limerick (IE)

(72) Inventors: Andreas Callanan, Murroe (IE); Colin Mcintosh, Newbury (GB)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 77 days.

(21) Appl. No.: 18/054,381

(22) Filed: Nov. 10, 2022

(65) Prior Publication Data

US 2023/0161730 A1    May 25, 2023

Related U.S. Application Data

(60) Provisional application No. 63/282,769, filed on Nov. 24, 2021.

(51) Int. Cl.
*G06F 13/42*     (2006.01)
*G06F 11/07*     (2006.01)
*G06F 11/10*     (2006.01)

(52) U.S. Cl.
CPC ...... *G06F 13/4282* (2013.01); *G06F 11/0772* (2013.01); *G06F 11/1004* (2013.01)

(58) Field of Classification Search
CPC ............. G06F 13/4282; G06F 11/0772; G06F 11/1004; G06F 11/0751; H04L 7/06; H04L 2001/0094; H04L 1/0061; H04L 1/242
See application file for complete search history.

(56) References Cited

U.S. PATENT DOCUMENTS

| | | | |
|---|---|---|---|
| 4,780,814 A | 10/1988 | Hayek | |
| 7,007,099 B1 | 2/2006 | Donati et al. | |
| 8,250,911 B2 | 8/2012 | Bauerle et al. | |
| 8,577,634 B2 | 11/2013 | Donovan et al. | |
| 8,887,022 B2 | 11/2014 | Hammerschmidt et al. | |

(Continued)

FOREIGN PATENT DOCUMENTS

| | | |
|---|---|---|
| CN | 105468563 B | 6/2018 |
| CN | 108470013 A | 8/2018 |
| CN | 105528325 B | 1/2019 |
| KR | 101637998 B1 | 7/2016 |

OTHER PUBLICATIONS

White, *A Tutorial for the Digital SENT Interface*, @ 2014 Integrated Device Technology, Inc., 4 pages.

(Continued)

*Primary Examiner* — Henry Tsai
*Assistant Examiner* — Kim T Huynh
(74) *Attorney, Agent, or Firm* — ArentFox Schiff LLP

(57) ABSTRACT

A technique for providing error detection during simplex serial data transmission, as well as associated methods and systems, are disclosed. The technique is based on a readback of the serially transmitted data on the external single wire bus. The readback data is internally processed and compared to the intended transmission data. An error is flagged where the intended and the actual data are not the same. One advantage of this technique is that it can be wrapped around an existing SENT hardware, thereby improving diagnostic coverage while not affecting the SENT protocol implementation itself.

20 Claims, 7 Drawing Sheets

(56) References Cited

U.S. PATENT DOCUMENTS

| | | | |
|---|---|---|---|
| 10,348,417 | B1 | 7/2019 | Krall et al. |
| 10,761,121 | B2 | 9/2020 | Kolof et al. |
| 2011/0246857 | A1 | 10/2011 | Bae et al. |
| 2016/0050089 | A1* | 2/2016 | Strasser .............. H04L 67/10 375/238 |
| 2017/0249225 | A1* | 8/2017 | Guddeti ............ G06F 11/263 |
| 2019/0199451 | A1* | 6/2019 | Krall ................ H04B 14/026 |
| 2020/0073691 | A1 | 3/2020 | Tsirkin et al. |
| 2021/0218261 | A1* | 7/2021 | Kofman ............ H02J 7/00712 |
| 2021/0374022 | A1 | 12/2021 | Gorbold et al. |
| 2023/0161730 | A1* | 5/2023 | Callanan ........... G06F 11/0751 |
| 2023/0391347 | A1* | 12/2023 | Hwang .............. G01R 31/52 |

OTHER PUBLICATIONS

"Hybrid Memory Cube Specification 2.0", Hybrid Memory Cube Consortium, 2014 Altera Corporation, 126 pages.

"TMS320DM646x DMSoC Serial Peripheral Interface (SPI)", User's Guide, Texas Instruments, Mar. 2011, 45 pages.

Bramta et al., "Implementation of SPI Protocol Using Error Correcting Techniques", Journal of Emerging Technologies and Innovative Research (JETIR), Jun. 2015, vol. 2, Issue 6, JETIR (ISSN-2349-5162), 3 pages.

English Translation (via epo.org Patent Translate of CN105468563B, 35 pages.

English Translation (via epo.org Patent Translate of CN105528325B, 12 pages.

English Translation (via epo.org Patent Translate of CN108470013A, 10 pages.

English Translation (via epo.org Patent Translate of KR20160060181B1, 1 page.

Kavanagh, "Cyclic Redundancy Checking Ensures Correct Data Communications", Analog Dialogue 45-02 Back Burner, Feb. 2011, 1 page.

Maxim et al., "The Method of Data Exchange Between High Performance PWM Modulator and MCU", XIII International Conference and Seminar on Micronanotechnologies and Electron Drives EDM 2012, 5 pages.

* cited by examiner

ENHANCED SAFETY MECHANISM FOR SINGLE WIRE INTERFACE

CROSS REFERENCE TO RELATED APPLICATIONS

This application claims the benefit of and priority from U.S. Provisional Patent Application No. 63/282,769, filed Nov. 24, 2021, titled "ENHANCED SAFETY MECHANISM FOR SINGLE WIRE INTERFACE," the disclosure of which is hereby incorporated by reference herein in their entirety.

TECHNICAL FIELD OF THE DISCLOSURE

The present disclosure generally relates to short-distance data communication over wired connections and, in particular, to techniques, methods, and systems for providing error detection during simplex serial data transmission.

BACKGROUND

Typically, an electrical system includes a number of different components that communicate with one another to perform system functions. The different components may be situated on the same integrated circuit chip or on different integrated circuit chips. Usually, an electrical system, such as the electrical system in a vehicle, includes one or more controllers, memory chips, sensor circuits, and actuator circuits. The controller digitally communicates with the memory chips, sensors, and actuators to control operations in the vehicle. For example, sensors may be used to measure various parameters within a vehicle and communicate those to a system controller such as an Electronic Control Unit (ECU) that processes sensors' output and may generate a feedback signal for desired operation of various parts of the vehicle. Examples of sensor data include current, speed, angle, linear position, temperature, pressure, voltage, and rotational direction of an article associated with a control module, such as a power steering module, a fuel injection module, or an anti-lock brake module in a vehicle.

One example of a point-to-point standard for transmitting data between two components (e.g., a sensor and a controller) over a wired interface is Single Edge Nibble Transmission (SENT) protocol. SENT is intended to allow for transmission of high-resolution data at a low system cost and, therefore, is well-suited for transmitting signal values from a sensor in a vehicle to a controller. Bits of data and synchronization information may be presented on a SENT line as LOW and HIGH states, e.g., a LOW state may be represented by a voltage smaller than about 0.5 Volts (V), while a HIGH state may be represented by a voltage greater than about 4 V.

Unfortunately, low-cost single wire interfaces, such as SENT, can have limited inherent diagnostic capability built into their formal protocols for some applications. Furthermore, their implementations are susceptible to driver side errors, electrostatic discharge (ESD) and electromagnetic interference (EMI). Still further, SENT has limited provisions for dealing with security situations where, e.g., someone tries to interfere with communications. Hence, a need exists for an enhanced diagnostic coverage in single wire interfaces, particularly simplex mode interfaces.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
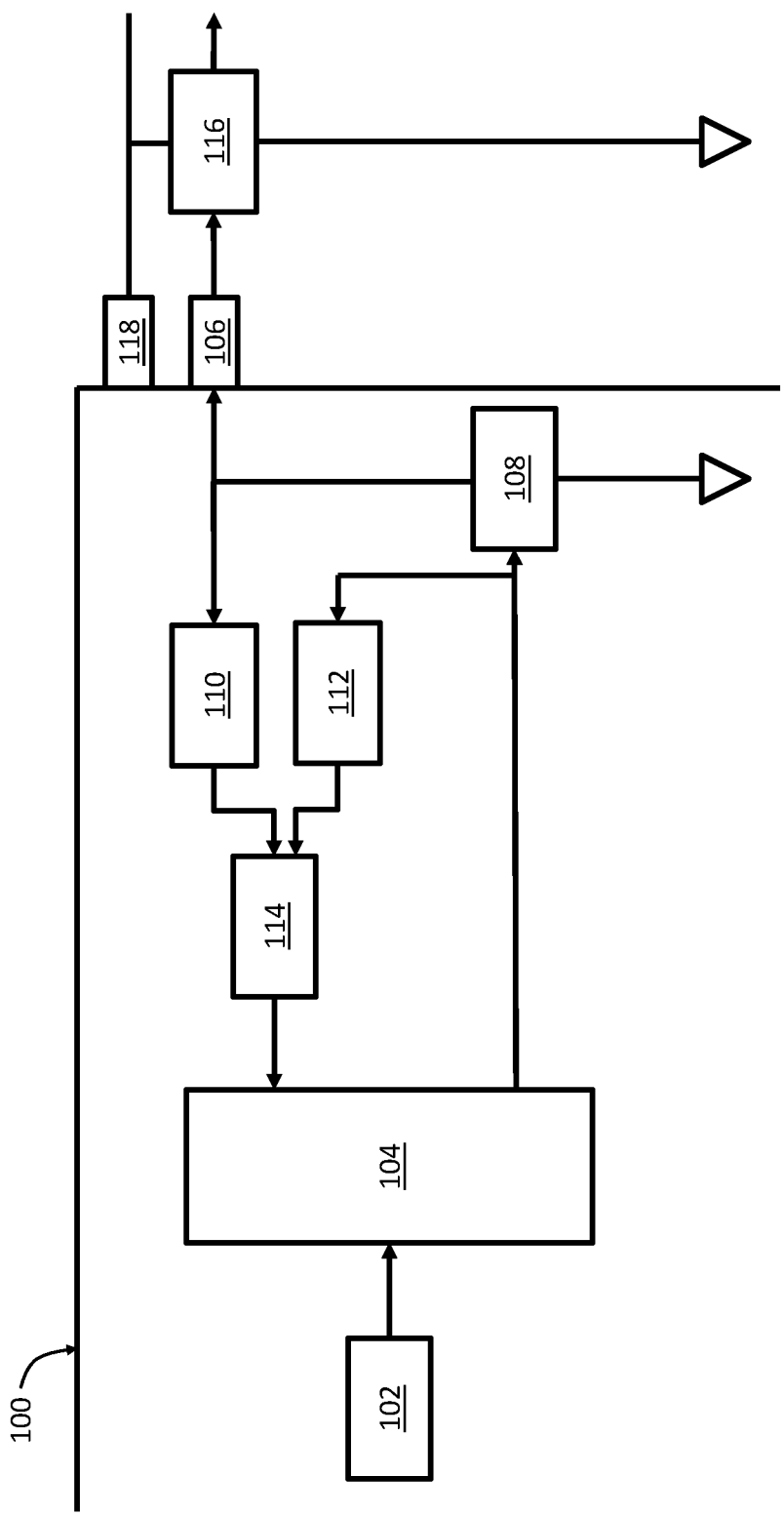
FIG. 1 provides a schematic illustration of a data communication system implementing direct readback sensing and comparison of readback data with data provided at an output of an encoder, in accordance with some embodiments of the present disclosure, FIG. 2 provides a schematic illustration of a data communication system implementing readback sensing on the physical layer and comparison of readback data with data provided at an output of an encoder, in accordance with some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

The present invention relates generally to short-distance data communication over wired connections (e.g., for communicating data produced by sensors in a vehicle), and, more particularly, to techniques, methods, and systems for detecting errors/faults in data/information transmission. Various embodiments relate generally to a method for processing a SENT signal. The present disclosure provides for enhanced diagnostic coverage in single wire interfaces, e.g., simplex mode interfaces, and may be particularly beneficial to automotive electronics.

Automotive electronics are becoming increasingly sophisticated. For example, vehicles include many microcontrollers that manage a variety of different functions, such as engine controls, safety systems, braking systems, etc. An ECU controls functions such as engine transmission and power generation and supply based on outputs from multiple sensors associated with the corresponding components of a vehicle. For example, a crankshaft position sensor mounted on a crankshaft transmits the angular position of the crankshaft to the ECU, based on which the ECU determines when to fire the spark plugs and inject fuel.

Similarly, other sensors including pressure, speed, and temperature sensors enable the ECU to control the vehicle in an effective manner. Content or messages are transmitted in numerous applications. For example, data is transmitted within vehicles, such as within an automobile to operate power windows or the like. Modern vehicles also utilize numerous sensors to monitor environmental conditions, i.e., physical quantities related to the operation of the vehicle or particular components thereof.

Failure of the transmission of digital data messages between electronic components via a communication link may result in a complete loss of the information intended to be transmitted. Moreover, in more complicated interrelated systems, a broken communication link may also result in the whole system becoming inoperable or becoming inefficient. Therefore, there is a desire to increase functional safety and reliability in the communication of data messages.

The need for ever increasing safety standards for automobile, design, manufacture and use, influences the design and implementation of electrical and electronic systems. The application of safety over the automotive lifecycle falls under the scope of international standards such as, but not limited to, ISO26262, IEC61508, and ISO21448. The ISO26262 standard in particular provides methodologies for the implementation of safety features such as diagnostics within automotive electrical and electronic systems. Depending on the function of a given system (e.g., braking, steering, infotainment, cabin lighting), varying degrees of safety requirements and thus varying degrees of diagnostic coverage may be needed. Such levels of safety are defined as Automotive Safety Integrity Level (ASIL). Conversely such systems, implemented according to ISO26262 can be compared against each other for consistency and compliance to a required ASIL.

Low-cost single wire interfaces typically have little or insufficient inherent diagnostic capability built into their formal protocols for application to Functional Safety Application. An example interface protocol is SAE J2716 SENT. SENT is a communication protocol for one-way communications between electronic modules, e.g., from a sensor to a computing device, typically within a vehicle. Data that may be communicated using SENT (referred to in the following as "SENT data") may include, synchronization information, sensor data such as magnetic, temperature, pressure, light, sound, or any other analog stimulus that any sensor/transducer may output and be converted to digital information/data for transmission. Although SENT protocol has some built in diagnostic features such as synchronization checking, a 4-bit CRC, data ID bits, status bits and a serial message CRC, additional safety measures may be required to achieve higher levels of Functional Safety.

Specifically, the 4-bit CRC only covers transmitted data and not the transmitted status, ID bits or synchronization information (i.e., the sync pulse and potentially the optional pause pulse). Moreover, the 4-bit CRC offers only limited diagnostic coverage on 2 (or more), bit failures. However, it is difficult to implement such additional measures while still complying to the SENT protocol. That is, implemented a higher diagnostic coverage CRC, e.g., AUTOSAR CRC-8, covering all transmitted data and stats bit would need a master SENT design that could recognize format. In other words, a bespoke non-compliant SENT protocol design.

The inventors of the present disclosure have identified these shortcomings and recognized a desire for overall robustness, simplified error detection, and a reduced number of components. Accordingly, a novel diagnostic in single wire, simplex interfaces is proposed. In particular, a technique for providing error detection during simplex serial data transmission, as well as associated methods and systems, are disclosed. The technique is based on a readback of the serially transmitted data on the external single wire bus. The readback data is internally processed and compared to the intended transmission data. An error is flagged where the intended transmission data and the actual transmission data are not the same. One advantage of this technique is that it can be wrapped around an existing SENT hardware, thereby improving diagnostic coverage while not affecting the SENT protocol implementation itself. This technique is an acceptable diagnostic methodology according to ISO26262-5:2018 Annex D Table D.6.

The basic unit of time in SENT is called a "tick," where a tick can be between 3-90 microseconds (μs), e.g., as selected by the sender. Each message may be preceded by a calibration pulse with a HIGH period of 56 ticks for framing and calibration of tick length. After the calibration pulse, each nibble may be transmitted with a fixed-width LOW signal, followed by a variable-length HIGH period. The LOW period may be 5 (or more) ticks in length, while the HIGH period can vary, for a total time between falling edges of between 12-27 ticks (representing nibbles ranging from 0-15). In various embodiments, the readback of data and comparison of the readback data to the intended transmission data may be performed tickwise, bitwise, or wordwise.

According to one aspect of the present disclosure, a system and/or method for enhanced diagnostic coverage in single wire interfaces comprises a simplex mode interface.

According to any one of the preceding or proceeding aspects of the present disclosure, the system and/or method for enhanced diagnostic coverage in single wire interfaces, the simplex mode interface is a SENT protocol module. For example, SENT data transmitted on the SENT communications channel is read back by the transmitting device and compared to the original synchronization and sensor data to be transmitted, for consistency. The readback data can either be sensed internally within the transmitting device or externally from the physical layer (which may also be referred to as "SENT bus"). This comparison can be performed tickwise, and bitwise or wordwise.

According to any one of the preceding or proceeding aspects of the present disclosure, the system and/or method for enhanced diagnostic coverage in single wire interfaces comprises sensor data from a sensor and other SENT protocol information (e.g., SENT diagnostics, timing info, synchronization, identification, etc.), as well as, optionally, other relevant information.

According to any one of the preceding or proceeding aspects of the present disclosure, the system and/or method for enhanced diagnostic coverage in single wire interfaces comprises converting the sensor data into a SENT message and, subsequently, transmitting the SENT message.

According to any one of the preceding or proceeding aspects of the present disclosure, the system and/or method for enhanced diagnostic coverage in single wire interfaces comprises transmitting the SENT message on a physical layer (i.e., a layer of a communication network where physical connections are made, sometimes also referred to as a "bus" or a "wire").

According to any one of the preceding or proceeding aspects of the present disclosure, the system and/or method for enhanced diagnostic coverage in single wire interfaces comprises internally reading back the transmitted SENT message.

According to any one of the preceding or proceeding aspects of the present disclosure, the system and/or method for enhanced diagnostic coverage in single wire interfaces comprises comparing the readback data (e.g., synchronization and sensor information) to the SENT message produced by the SENT protocol encoder module.

According to any one of the preceding or proceeding aspects of the present disclosure, the system and/or method for enhanced diagnostic coverage in single wire interfaces comprises detecting a mismatch.

According to any one of the preceding or proceeding aspects of the present disclosure, the system and/or method for enhanced diagnostic coverage in single wire interfaces comprises detecting an error.

According to any one of the preceding or proceeding aspects of the present disclosure, the system and/or method for enhanced diagnostic coverage in single wire interfaces comprises modification of the SENT cyclic redundancy check (CRC) to be included in the current SENT message and/or frame. This could be done by flipping the last bit of the SENT CRC (effectively corrupting the CRC, the last part of the SENT message), where the receiver would detect an error from decoding the SENT CRC as *fail*.

According to any one of the preceding or proceeding aspects of the present disclosure, the system and/or method for enhanced diagnostic coverage in single wire interfaces comprises producing a flag to be included in a subsequent SENT message and/or frame. This could be also done by flipping the last bit of the SENT CRC (effectively corrupting the CRC, the last part of the SENT message), where the receiver would detect an error from decoding the SENT CRC as *fail*.

According to any one of the preceding or proceeding aspects of the present disclosure, the system and/or method for enhanced diagnostic coverage in single wire interfaces upon detecting a fault, comprises halting the transmission of the SENT message and/or frame. This could be done by not driving the SENT bus to a low state, effectively corrupting the synchronization information, nibble duty cycle requirement and pause pulse, where the receiver would detect an error from application of SENT protocol timing specific diagnostics related to Sync Pulse, nibble and pause pulse requirements.

According to any one of the preceding or proceeding aspects of the present disclosure, the system and/or method for enhanced diagnostic coverage in single wire interfaces comprises, upon detecting a fault, automatically resending the intended SENT message and/or frame to the bus. In one further aspect, the system and/or method for enhanced diagnostic coverage in single wire interfaces comprises the option to configure the number of times that resending of the intended SENT message and/or frame to the bus is attempted. In one further aspect, the system and/or method for enhanced diagnostic coverage in single wire interfaces comprises the option to configure the response to a detected fault.

According to any one of the preceding or proceeding aspects of the present disclosure, the system and/or method for enhanced diagnostic coverage in single wire interfaces comprises reading back the external SENT message.

According to any one of the preceding or proceeding aspects of the present disclosure, the system and/or method for enhanced diagnostic coverage in single wire interfaces, wherein the external readback is from a SENT bus.

According to any one of the preceding or proceeding aspects of the present disclosure, the system and/or method for enhanced diagnostic coverage in single wire interfaces comprises comparing the readback sensor message to the SENT message produced by the SENT protocol encoder module.

According to any one of the preceding or proceeding aspects of the present disclosure, the system and/or method for enhanced diagnostic coverage in single wire interfaces comprises performs a bitwise analysis.

According to any one of the preceding or proceeding aspects of the present disclosure, the system and/or method for enhanced diagnostic coverage in single wire interfaces comprises performs a tickwise analysis (e.g., may be relevant to timing comparison).

According to any one of the preceding or proceeding aspects of the present disclosure, the system and/or method for enhanced diagnostic coverage in single wire interfaces comprises converting a readback SENT message back to native data (e.g., may be relevant to wordwise comparison).

According to any one of the preceding or proceeding aspects of the present disclosure, the system and/or method for enhanced diagnostic coverage in single wire interfaces, wherein the native data comprises sensor data.

According to any one of the preceding or proceeding aspects of the present disclosure, the system and/or method for enhanced diagnostic coverage in single wire interfaces, wherein the native data comprises synchronization data.

According to any one of the preceding or proceeding aspects of the present disclosure, the system and/or method for enhanced diagnostic coverage in single wire interfaces, wherein the native data comprises status data.

According to any one of the preceding or proceeding aspects of the present disclosure, the system and/or method for enhanced diagnostic coverage in single wire interfaces, wherein the native data comprises a subset of sensor data, e.g., angular data, temperature data.

According to any one of the preceding or proceeding aspects of the present disclosure, the system and/or method for enhanced diagnostic coverage in single wire interfaces, wherein the native data comprises transmission protocol information.

According to any one of the preceding or proceeding aspects of the present disclosure, the system and/or method for enhanced diagnostic coverage in single wire interfaces wherein the decoded SENT message comes from a SENT bus.

According to any one of the preceding or proceeding aspects of the present disclosure, the system and/or method for enhanced diagnostic coverage in single wire interfaces wherein the decoded SENT message is internally routed/produced.

According to any one of the preceding or proceeding aspects of the present disclosure, the system and/or method for enhanced diagnostic coverage in single wire interfaces comprises comparing the decoded/reconverted message to the native data.

According to any one of the preceding or proceeding aspects of the present disclosure, the system and/or method for enhanced diagnostic coverage in single wire interfaces comprises comparing the encoded SENT ticks on the external bus to the intended SENT protocol encoded tick data.

According to any one of the preceding or proceeding aspects of the present disclosure, the system and/or method for enhanced diagnostic coverage in single wire interfaces comprises a wordwise comparison and/or analysis.

According to any one of the preceding or proceeding aspects of the present disclosure, the system and/or method for enhanced diagnostic coverage in single wire interfaces comprises a pass/fail determination.

According to any one of the preceding or proceeding aspects of the present disclosure, the system and/or method for enhanced diagnostic coverage in single wire interfaces comprises a comparator.

According to any one of the preceding or proceeding aspects of the present disclosure, the system and/or method for enhanced diagnostic coverage in single wire interfaces comprises a logic circuit.

According to any one of the preceding or proceeding aspects of the present disclosure, the system and/or method for enhanced diagnostic coverage in single wire interfaces, wherein the logic circuit is a logic comparator.

The drawings show exemplary readback circuits and configurations. Variations of these circuits, for example, changing the positions of, adding, or removing certain elements from the circuits are not beyond the scope of the present invention. The illustrated error detection, configurations, and complementary devices are intended to be complementary to the support found in the detailed description.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

FIG. 1 provides a schematic illustration of a data communication system 100 (e.g., a SENT system), implementing direct readback sensing and comparison of readback data with data provided at an output of an encoder 104 (e.g., a SENT protocol encoder), in accordance with some embodiments of the present disclosure. As shown in FIG. 1, the system 100 may include a data source 102 configured to provide data and status information to an input of the encoder 104. The data source 102 may include, e.g., one or more sensors, and the data provided by the data source 102 may be sensor measurement data to be transmitted over a wired interface 106 (e.g., a SENT protocol interface). For example, examples of data provided to the input of the encoder 104 may include current, speed, angle, linear position, temperature, pressure, voltage, and rotational direction of an article associated with a control module, such as a power steering module, a fuel injection module, or an anti-lock brake module in a vehicle. The status information may include application specific information, fault information or other miscellaneous use case specific information.

The system 100 is configured to implement direct readback sensing and comparison of readback data with data provided at the output of the encoder 104. To that end, the system 100 may include a transistor 108, a buffer 110, an inverter 112, and a comparator 114. FIG. 1 further illustrates that data transmitted by the system 100 over the wired interface 106 may further be communicated over an external network 116. FIG. 1 also illustrates an interface 118 for supplying power for various components of the system 100.

Although descriptions of FIG. 1 and subsequent drawings may refer to particular circuit components, such as an inverter, an XOR logic gate, or a particular type of transistors, the exact design of systems with readback sensing and comparison of readback data may be realized in many different ways, all of which being within the scope of the present disclosure. In one example of design variations according to various embodiments of the present disclosure, a choice can be made, individually for each of the transistors described herein, to employ field-effect transistors (FETs), e.g., metal-oxide-semiconductor (MOS) technology transistors (e.g., where various transistors may be N-type MOS (NMOS) or P-type MOS (PMOS) transistors), bipolar transistors (e.g., where various transistors may be NPN or PNP transistors), other types of transistors, or any combination of different types of transistors. In view of that, even though the following descriptions refer to the transistor 108 being a FET having gate, drain, and source terminals, these descriptions may be generalized to refer to a transistor having any first, second, and third terminals. The term "first terminal" of a transistor may be used to refer to an emitter terminal if the transistor is a bipolar transistor or to a source terminal if the transistor is a FET, the term "second terminal" of a transistor may be used to refer to a collector terminal if the transistor is a bipolar transistor or to a drain terminal if the transistor is a FET, and the term "third terminal" of a transistor may be used to refer to a base terminal if the transistor is a bipolar transistor or to a gate terminal if the transistor is a FET. These terms remain the same irrespective of whether a transistor of a given technology is an N-type transistor (e.g., an NPN transistor if the transistor is a bipolar transistor or an NMOS transistor if the transistor is a FET) or a P-type transistor (e.g., a PNP transistor if the transistor is a bipolar transistor or a PMOS transistor if the transistor is a FET). In another example, in various embodiments, a choice can be made, individually for each of the transistors described herein, as to which transistors are implemented as N-type transistors (e.g., NMOS transistors for the transistors implemented as FETs, or NPN transistors for the transistors implemented as bipolar transistors) and which transistors are implemented as P-type transistors (e.g., PMOS transistors for the transistors implemented as FETs, or PNP transistors for the transistors implemented as bipolar transistors). In yet other examples, in various embodiments, a choice can be made as to what type of transistor architecture to employ. For example, any of the transistors described herein that are implemented as FETs may be planar transistors or may be non-planar transistors (some examples of the latter including FinFETs, nanowire transistors or nanoribbon transistors).

In one embodiment of FIG. 1, sensor data and status provided by the data source 102 is encoded by the encoder 104 which couples the data to the gate of the transistor 108 and to the inverter 112 (i.e., the output data of the encoder 104 is provided to the transistor 108 and the inverter 112). The encoder may append the relevant synchronization information to the status and data information to be transmitted. The signal from the drain of the transistor 108 is then provided to two paths, with one path going to the external network 116 via the wired interface 106 (e.g., SENT bus), and the other path going to the internal sense buffer 110 of the system 100. Outputs from the inverter 112 and the buffer 110 are then compared via the comparator 114.

In some embodiments, the comparator 114 may be a digital logic gate, e.g., an XOR gate. Exclusive or OR's exclusive disjunction is a logical operation that is TRUE (e.g., 1 or HIGH state) if and only if its arguments differ (one is TRUE, the other is FALSE (e.g., 0 or LOW)). XOR gate (sometimes EOR, or EXOR and pronounced as Exclusive OR) is a digital logic gate that gives a TRUE output when the number of TRUE inputs is odd. An XOR gate implements an exclusive OR from mathematical logic; that is, a TRUE output results if one, and only one, of the inputs to the logic gate is TRUE. If both inputs are false (0/LOW) or both are TRUE, the output is FALSE. XOR represents the inequality function, i.e., the output is TRUE if the inputs are not alike otherwise the output is FALSE. Alternatively, the comparator may be an EXNOR gate which will indicate a difference between its inputs as a FALSE (e.g., 0 or LOW state). Other means of achieving equivalent functionality may be devised, all of which being included within the scope of the present disclosure. Similarly, the inverter 112 may also be implemented in different ways, e.g., as one or more digital logic gates, all of which being included within the scope of the present disclosure.

In operation of the system 100, the output data of the encoder 104 is considered to be the "intended transmission data" and it is XOR'd with that sensed internally (i.e., with that sensed before it is transmitted over the wired interface 106), by means of the transistor 108, on the wired interface 106. A TRUE output of the XOR gate of the comparator 114 means that the two inputs to the comparator 114 are logically different and, therefore, may be particularly advantageous in identifying a mismatch between the intended transmission data (i.e., the output of the encoder 104 for the embodiment shown in FIG. 1) and the readback data (i.e., data readback from the wired interface 106 for the embodiment shown in FIG. 1, which is considered to be the "actual transmission data"). This indicates an error has occurred. In some embodiments, the encoder 104 may include a clock which can be used to sample the XOR output at an appropriate time. In some embodiments, the system 100 may be configured to re-transmit the data for which a mismatch is identified by the comparator 114. In some embodiments, the system 100 may be configured to allow a user to set the number of times the data for which a mismatch is identified to be re-transmitted.

In practice, a Fail can be a logic 1 and used to indicate a fault by corrupting the SENT CRC in the currently transmitted message. A CRC is an error-detecting code commonly used in digital networks and storage devices to detect accidental changes to raw data. Blocks of data entering these systems get a short check value attached, based on the remainder of a polynomial division of their contents. On retrieval, the calculation is repeated and, in the event the check values do not match, corrective action can be taken against data corruption.

CRCs are so called because the check (data verification) value is a redundancy (it expands the message without adding information) and the algorithm is based on cyclic codes. CRCs are popular because they are simple to implement in binary hardware, easy to analyze mathematically, and particularly good at detecting common errors caused by noise in transmission channels. Because the check value has a fixed length, the function that generates it is occasionally used as a hash function. CRC is defined in the SENT protocol.

Figure 2:
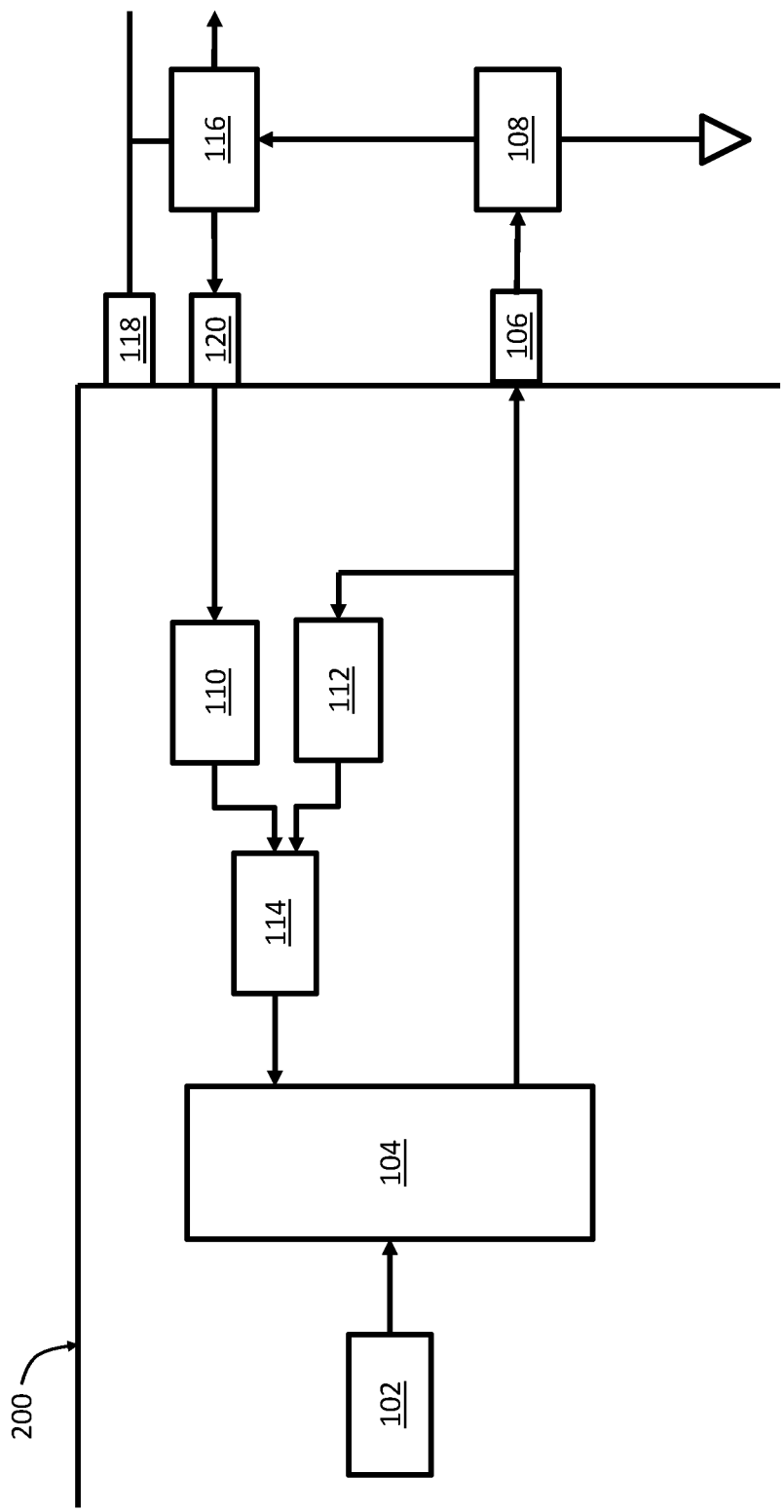

FIG. 2 provides a schematic illustration of a data communication system 200 (e.g., a SENT system) implementing readback sensing on the physical layer and comparison of readback data with data provided at an output of an encoder, in accordance with some embodiments of the present disclosure. The system 200 may be similar to the system 100, as represented by some components shown in FIG. 1 being shown in FIG. 2. In the interests of brevity, not all descriptions of the system 100 are repeated for the system 200 but, rather, only the differences are described.

As shown in FIG. 2, in contrast to the system 100 where the transistor 108 was internal to the system 100 in that it is configured to receive output of the encoder 104 before that output is transmitted on the wired interface 106, in the system 200 the transistor 108 is external to the system 200 in that it is configured to receive output of the encoder 104 after that output is transmitted on the wired interface 106. The output of the transistor 108 may then be provided back to the system 200, e.g., via a further wired interface 120 (e.g., a pin), e.g., by passing through the external network 116 (e.g., an ECU), as shown in FIG. 2. Thus, the external network 116 may be coupled to the system 200 via the further wired interface 120. The data received at the further wired interface 120 may then be provided to the buffer 110. Similar to the system 100, in the system 200, the output data of the encoder 104 is considered to be the "intended transmission data," provided to the inverter 112. In contrast to the system 100, in the system 200, the intended data is compared by the comparator 114 (e.g., an XOR logic gate as described above) with that sensed externally (i.e., with that sensed after it was transmitted over the wired interface 106, which is considered to be the "actual transmission data") by means of the transistor 108.

In computer architecture, a bus is a communication system that transfers data between components inside a computer, or between computers. This expression covers all related hardware components (wire, optical fiber, etc.) and software, including communication protocols. Early computer buses were parallel electrical wires with multiple hardware connections, but the term is now used for any physical arrangement that provides the same logical function as a parallel electrical bus. Modern computer buses can use both parallel and bit serial connections and can be wired in either a multidrop (electrical parallel) or daisy chain topology, or connected by switched hubs, as in the case of USB.

In the present embodiment, the SENT bus is a serial bus. The sensed signal is read back over the buffer and XOR's with the output of the inverter. Similar to the previous embodiment, SENT logic level is checked bit by bit, or tick by tick. In some embodiments, some of the elements can be extended to an external physical layer (PHY), or 'bus'. This would yield the advantage of detecting external interference faults. A physical layer (PHY) is an electronic circuit, usually implemented as an integrated circuit, required to implement physical layer functions of the Open Systems Interconnection (OSI) model in a network interface controller.

In operation, outputs from the inverter and buffer are compared by means of an XOR logic function. An XOR output=1 means its inputs logically are different. This indicates an error has occurred. In some embodiments, the SENT protocol circuit comprises a clock which can be used to sample the XOR output at an appropriate time. In some embodiments the compare function may use other logic functions.

Figure 3:
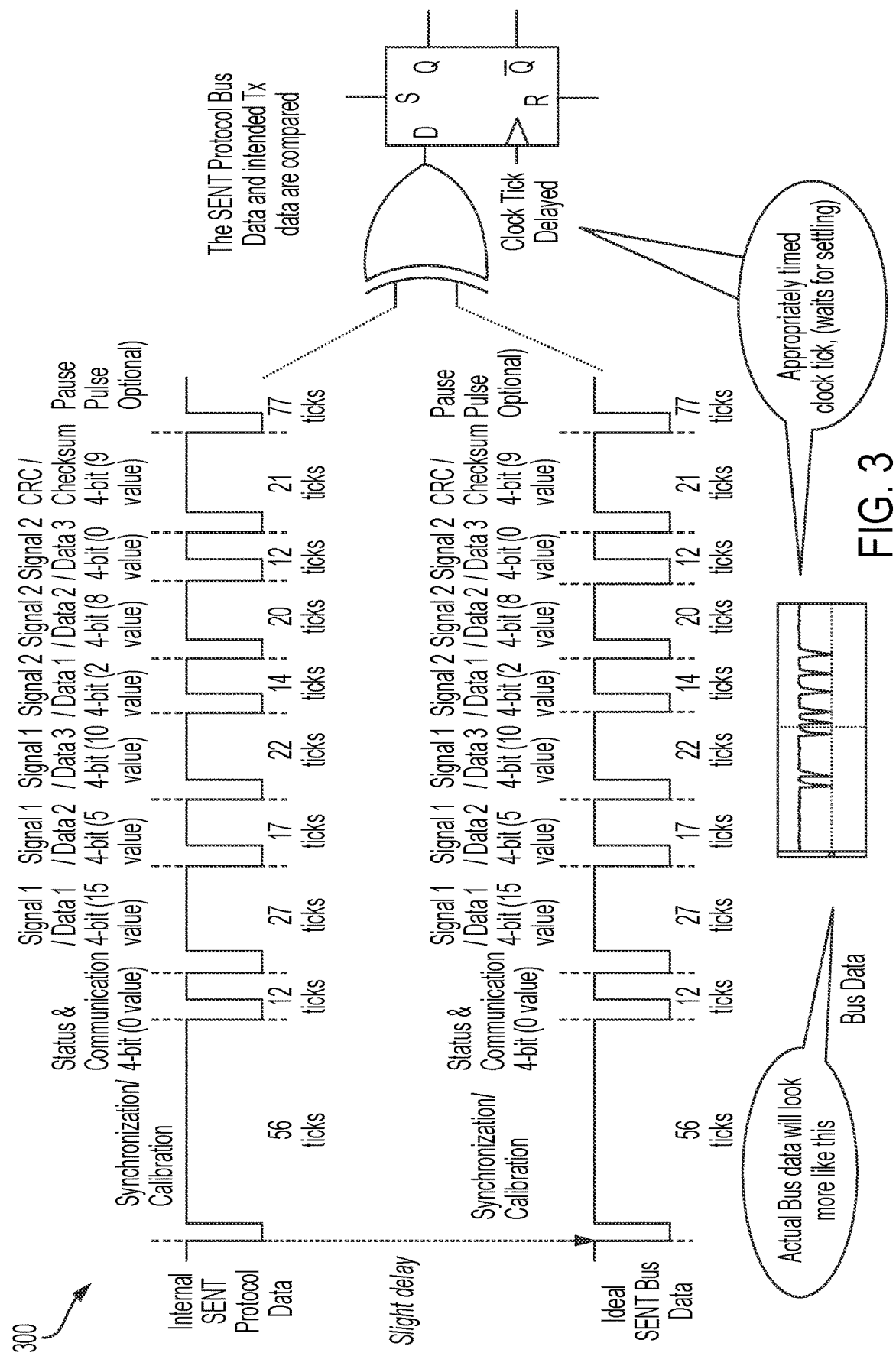
FIG. 3 shows an exemplary timing diagram of single bitwise comparison, in accordance with some embodiments of the present disclosure.

FIG. 3 shows an exemplary timing diagram of single bitwise or tickwise comparison, in accordance with some embodiments of the disclosure provided herein. The present example depicts the transmission and juxtaposition of a frame. A frame is a digital data transmission unit in computer networking and telecommunication. In packet switched systems, a frame is a simple container for a single network packet. In other telecommunications systems, a frame is a repeating structure supporting time-division multiplexing.

A frame typically includes frame synchronization features consisting of a sequence of bits or symbols that indicate to the receiver the beginning and end of the payload data within the stream of symbols or bits it receives. If a receiver is connected to the system during frame transmission, it ignores the data until it detects a new valid frame synchronization sequence.

Turning to FIG. 3, frame comprises Synchronization/Calibration, Status & Communication, Signal 1, Signal 2, CRC/Checksum and optional pause pulse. A checksum is a small-sized block of data derived from another block of digital data for the purpose of detecting errors that may have been introduced during its transmission or storage. By themselves, checksums are often used to verify data integrity but are not relied upon to verify data authenticity. Signals 1 and 2 each comprise Delta 1, 2, and 3 data.

As can be appreciated by one skilled in the art, there will be some latency in the readback frame. Consequently, when the XOR compares the SENT Protocol Bus Data and intended Tx data, there will inherently be some delay. In one or more embodiments, an appropriately timed clock tick is chosen to wait for settling. In other embodiments, other devices and circuits can be added. For example, sampling point, or setup and hold times can be adjusting using Flip-Flops or using delay cells.

Some of the advantages of the aforementioned tickwise detection is the ability to tell if the synchronization, data or optional pause pulse on the SENT Bus has been corrupted. Additionally, it can be determined if the SENT Bus has been pulled low, or potentially overloaded. Thus, indirectly it can be potentially determined if the driver device is damaged.

Figure 4:
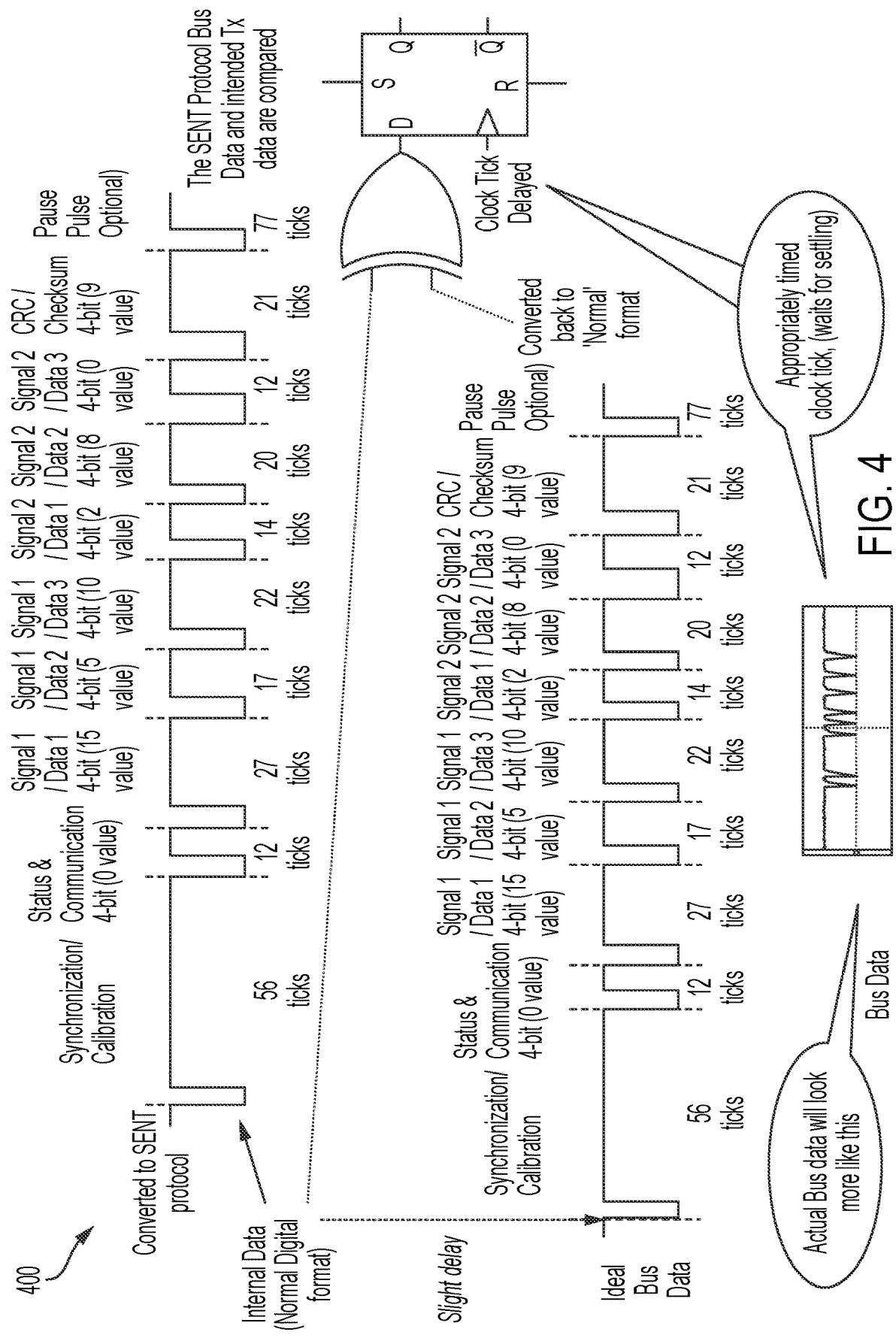
FIG. 4 shows an exemplary timing diagram of wordwise comparison, in accordance with some embodiments of the present disclosure, FIG. 5 provides a schematic illustration of a data communication system implementing direct readback sensing and comparison of readback data with data provided at an input to an encoder, in accordance with some embodiments of the present disclosure, FIG. 6 provides a schematic illustration of a data communication system implementing readback sensing on the physical layer and comparison of readback data with data provided at an input to an encoder, in accordance with some embodiments of the present disclosure, and FIG. 7 provides a block diagram illustrating an example data processing system that may be used to control operation of a data communication system implementing readback sensing and comparison as described herein, in accordance with some embodiments of the present disclosure.

FIG. 4 shows an exemplary timing diagram of wordwise comparison, in accordance with some embodiments of the disclosure provided herein. Turning to FIG. 4, a typical frame comprises Synchronization/Calibration, Status & Communication, Signal 1, Signal 2, CRC/Checksum and pause pulse. A checksum is a small-sized block of data derived from another block of digital data for the purpose of detecting errors that may have been introduced during its transmission or storage. By themselves, checksums are often used to verify data integrity but are not relied upon to verify data authenticity. Signals 1 and 2 each comprise Delta 1, 2, and 3 data.

In the present embodiment, readback SENT frames are converted back into normal data format before comparison. The readback frames can either come from a SENT bus or internally, both of which will be discussed later in the disclosure. As can be appreciated by one skilled in the art, there will be some latency in the readback frame. Consequently, when the XOR compares the SENT Protocol Bus Data and intended Tx data, there will inherently be some delay. In one or more embodiments, an appropriately timed clock tick is chosen to wait for settling. In other embodiments, other devices and circuits can be added. For example, sampling point, or setup and hold times can be adjusting using Flip-Flops or using delay cells.

Here, there is the need to reconvert the sensed SENT protocol data on the bus back into normal 8/16 bit (etc.) digital data. The compare then is made between the source information content prior to internal conversion to SENT protocol and the actual SENT protocol transmitted on to the SENT bus itself.

The present wordwise comparison gives rise to the following error determinations. One skilled in the art can tell if the data on the SENT Bus has been corrupted. Also, one skilled in the art can tell if the SENT Bus has been pulled low or potentially overloaded. Additionally, one skilled in the art can tell if the internal SENT protocol generator has a fault, i.e., the SENT Block itself is covered or can tell if the decode back from SENT is faulty.

While the inventors of the present disclosure recognize that some additional on chip hardware is required in a wordwise comparison relative to the simple, bitwise or tickwise, version, the diagnostic coverage is higher. This is more complex to implement as the original source information has to be put 'back together' from the bus before a 'wordwise' (8 or 16 bits say), compare can be made. It is also feasible to combine tickwise and wordwise consistency checking methods for a higher degree of confidence in the error detection. They are not mutually exclusive.

Figure 5:
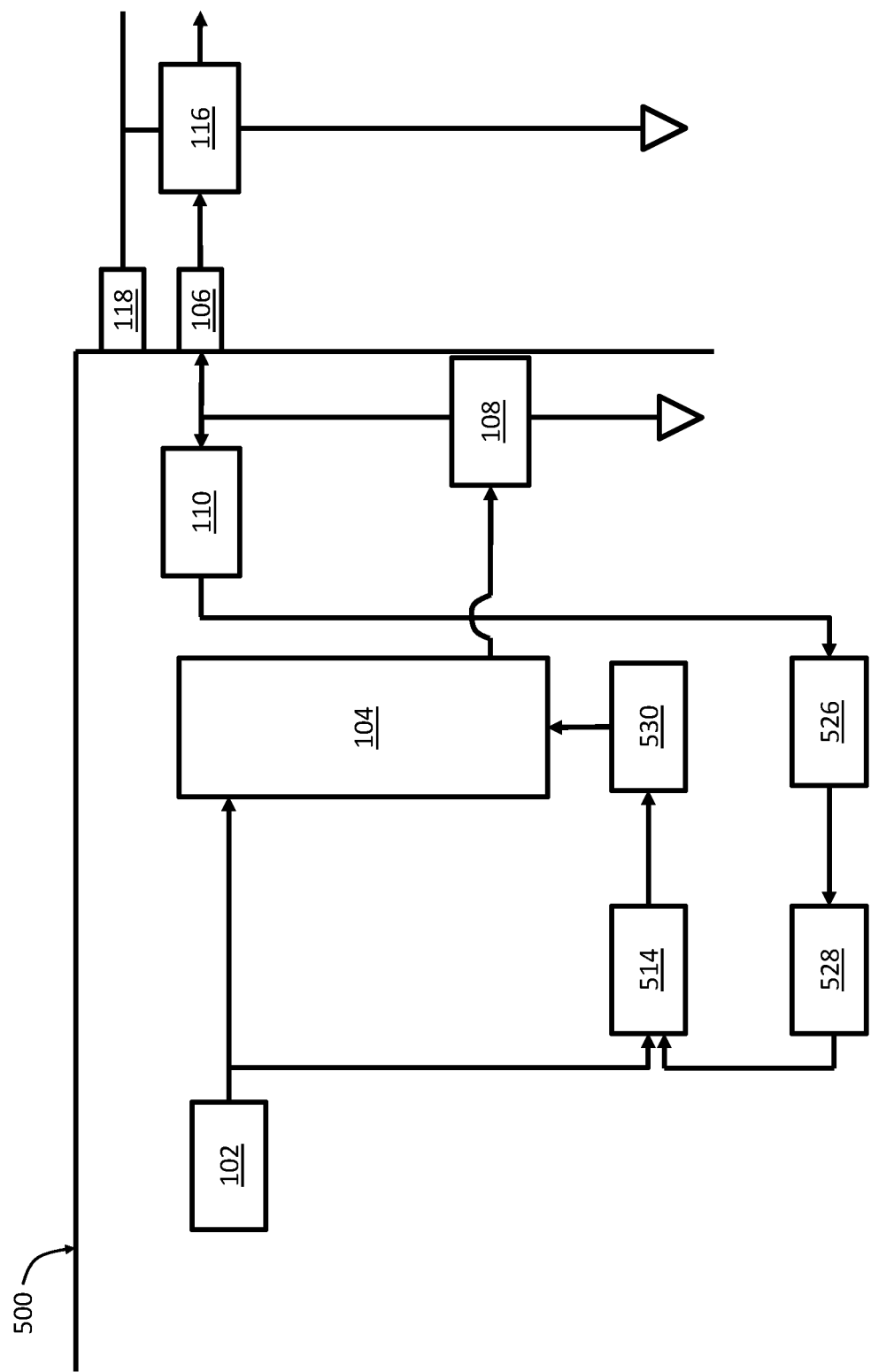

FIG. 5 provides a schematic illustration of a data communication system 500 (e.g., a SENT system), implementing direct readback sensing and comparison of readback data with data provided at an input to an encoder (e.g., a SENT protocol encoder), in accordance with some embodiments of the present disclosure. The system 500 may be similar to the system 100, as represented by some components shown in FIG. 1 being shown in FIG. 5. In the interests of brevity, not all descriptions of the system 100 are repeated for the system 500 but, rather, only the differences are described.

As shown in FIG. 5, similar to the system 100, in the system 500 the transistor 108 is internal to the system 100 in that it is configured to receive output of the encoder 104 before that output is transmitted on the wired interface 106. Thus, in both the system 100 and the system 500, the actual transmission data is read back internally, before the output from the encoder 104 is transmitted over the wired interface 106. In contrast to the system 100, in the system 500 the intended transmission data is the data at the input to the encoder 104 (e.g., the data provided by the data source 102).

FIG. 5 further illustrates some additional components showing an example embodiment of how comparison of the intended and the actual transmission data may be carried out to identify any mismatches. For example, the system 500 may include a comparator 514, a decoder 526 (e.g., a SENT protocol decoder), an optional data and status check module 528, and an optional pass/fail module 530. The comparator 514 may be similar to the comparator 114 in its functionality but may be implemented as an N-bit digital comparator, instead of an XOR logic gate.

In one embodiment of FIG. 5, sensor data provided by the data source 102 is encoded by the encoder 104 which couples the data to the gate of the transistor 108 (i.e., the output data of the encoder 104 is provided to the transistor 108). The signal from the drain of the transistor 108 is then provided to two paths, with one path going to the external network 116 via the wired interface 106 (e.g., SENT bus), and the other path going to the internal sense buffer 110 of the system 500. The data from the buffer 110 may be passed to the decoder 526, configured to decode the data encoded by the encoder 104 so that it can later be compared to the original data provided at the input to the encoder 104. For example, the decoder 526 may re-convert the SENT protocol encoded data output by the encoder 104 back to simple binary data. If included in the system 500, the data and status check module 528 may be configured to check the data and status of the data generated by the decoder 526, before it is provided to the comparator 514. If the data and status check module 528 is not included in the system 500, the output of the decoder 526 may be provided to the comparator 514 directly.

The comparator 514 may further receive data at the input to the encoder 104 and compare it to the data provided from the decoder 526 to identify any mismatches. The comparator 514 may be a digital comparator and may perform a wordwise comparison between intended and actual transmission data, in some embodiments. If included, the pass/fail module 530 may receive a result of the comparison from the comparator 514, and provide to the encoder 104 an indication as to whether the comparison passed the test (i.e., intended and actual transmission data were the same) or failed the test (i.e., intended and actual transmission data were not the same). If the pass/fail module 530 is not included in the system 500, the result of the comparison may be provided from the comparator 514 to the encoder 104 directly. The encoder 104 may then include information regarding the comparison in subsequent frames. For example, if a fail occurs, the next status bit transmitted can be used to flag this. It is noteworthy that a failure in the SENT protocol can be propagated into the SENT CRC or indicated by halting transmission. Optionally, upon detection of a fault the original SENT message may be automatically retransmitted for a predetermined number of attempts.

Figure 6:
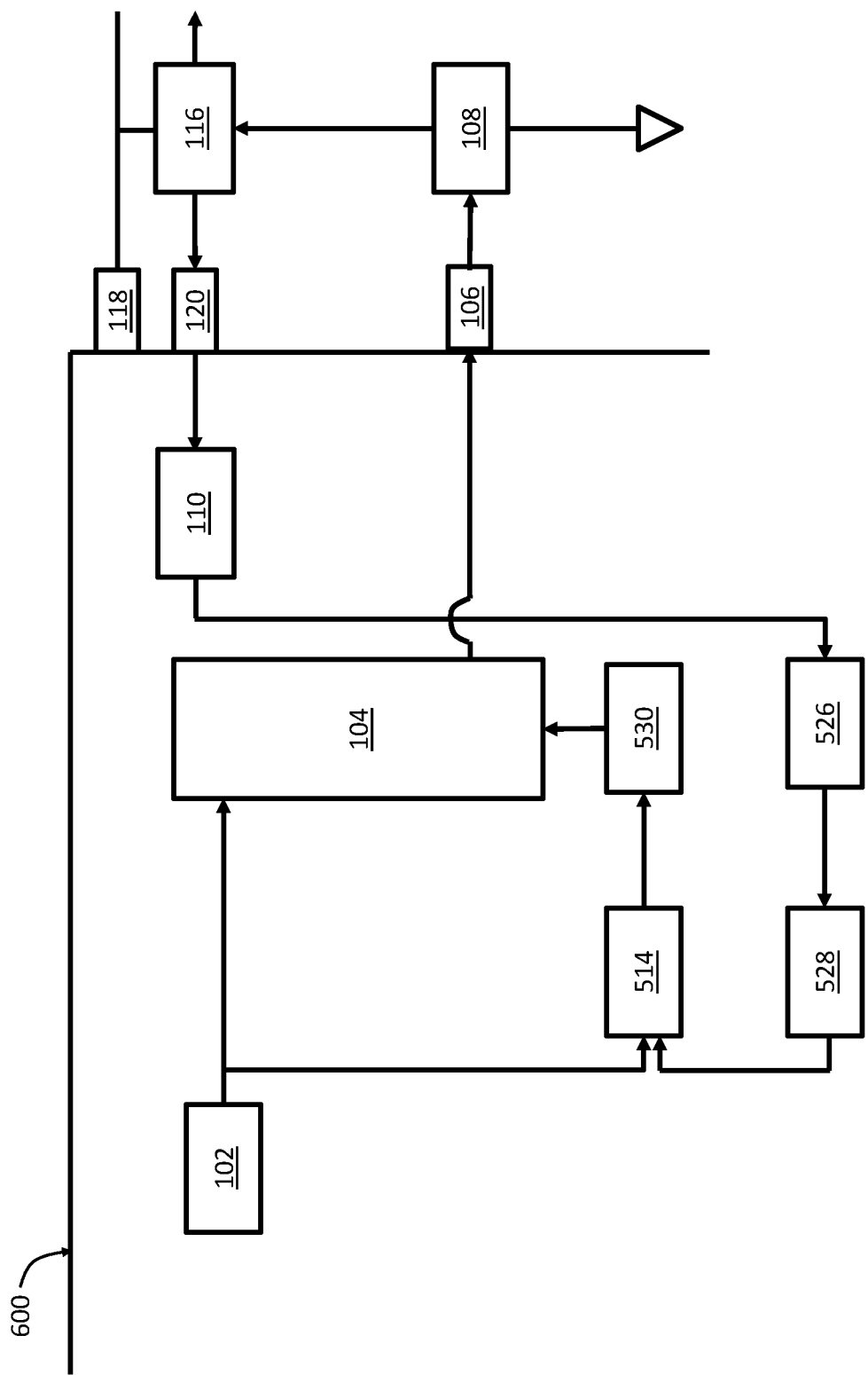

FIG. 6 provides a schematic illustration of a data communication system 600 (e.g., a SENT system), implementing readback sensing on the physical layer and comparison of readback data with data provided at an input to an encoder (e.g., a SENT protocol encoder), in accordance with some embodiments of the present disclosure. The system 600 may be similar to the system 500, as represented by some components shown in FIG. 5 being shown in FIG. 6. In the interests of brevity, not all descriptions of the system 500 are repeated for the system 600 but, rather, only the differences are described. Viewed differently, the system 600 may be similar to the system 200, as represented by some components shown in FIG. 2 being shown in FIG. 6.

As shown in FIG. 6, in contrast to the system 500 where the transistor 108 was internal to the system 500 in that it is configured to receive output of the encoder 104 before that output is transmitted on the wired interface 106, in the system 600 the transistor 108 is external to the system 600 in that it is configured to receive output of the encoder 104 after that output is transmitted on the wired interface 106. Similar to the system 200 of FIG. 2, the output of the transistor 108 of the system 600 may then be provided back to the system 600 via the further wired interface 120, e.g., by passing through the external network 116, as shown in FIG. 6. Thus, the external network 116 may be coupled to the system 600 via the further wired interface 120. Similar to the system 200, in the system 600, the data received at the further wired interface 120 may then be provided to the buffer 110. Similar to the system 500, in the system 600, the input data to the encoder 104 is considered to be the "intended transmission data" and the data output by the buffer 110 is decoded by the decoder 526 and subsequently a comparison is made by the comparator 514 as described above for FIG. 5.

FIGS. 1, 2, 5, and 6 do not present an exhaustive list of data communication systems with readback functionality as described herein and, in further embodiments, various components shown in these drawings or described herein may be replaced by other components with analogous functionality. For example, the transistor 108 was described above as a field-effect transistor (FET) having gate, drain, and source regions. In some embodiments, such a transistor may be a metal-oxide-semiconductor (MOS) transistor, e.g., an N-type MOS (NMOS) transistor. As is known in the art, a MOS transistor is a type of insulated-gate field-effect transistor that is fabricated by the controlled oxidation of a semiconductor, typically silicon. The voltage of the covered gate determines the electrical conductivity of the device; this ability to change conductivity with the amount of applied voltage can be used for amplifying or switching electronic signals. However, in other embodiments, descriptions provided herein with respect to the transistor 108 are equally applicable to transistors other than MOS transistors and/or to devices other than transistors configured to amplify or switch electronic signals. In another example, while the present disclosure describes XOR logic gates, buffers, inverters, flip-flops, and digital comparators, any other suitable devices are not beyond the scope of the present disclosure. For example, numerous logic circuits can replace the XOR logic gate of the comparator 114 or the digital comparator of the comparator 514. Also, a latch or any delay type device can be used to correct the timing in the systems 100, 200, 500, and 600. Furthermore, the present invention needed be applied solely to SENT protocol, as any simplex/serial data protocols and architectures are equally appliable.

Figure 7:
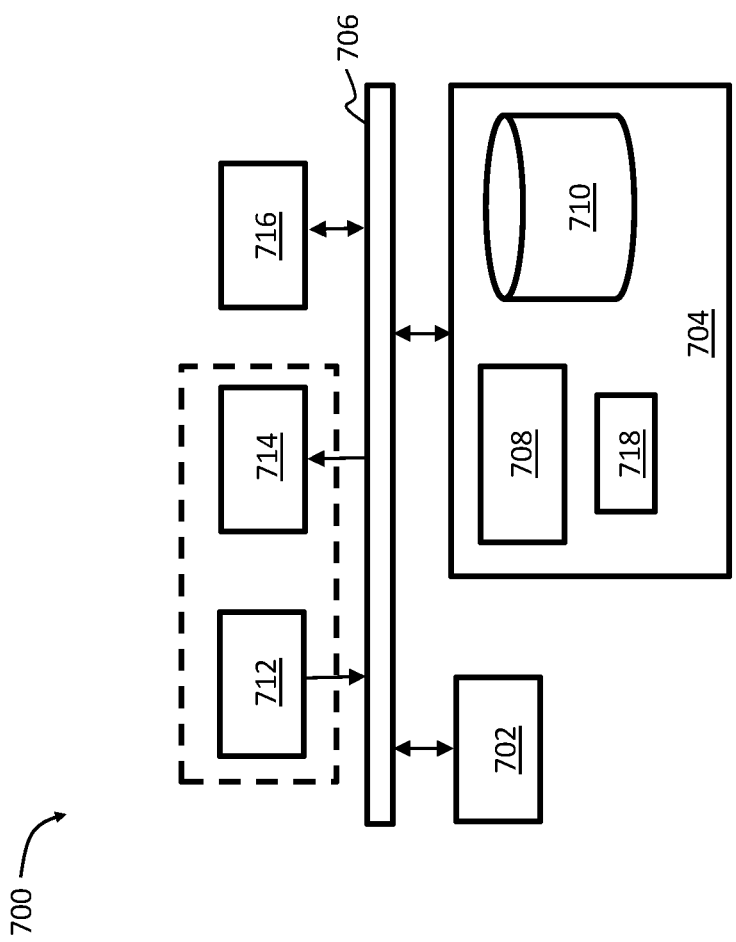

FIG. 7 provides a block diagram illustrating an example data processing system 700 that may be used to control operation of a data communication system implementing readback sensing and comparison as described herein, in accordance with some embodiments of the present disclosure. For example, the example data processing system 700 may control operation of any of the data communication systems 100, 200, 500, and 600.

For each of the figures FIG. 5 and FIG. 7. It is possible to include the error checking functionality of the respective FIG. 1 and FIG. 2, i.e., tickwise error checking. Which allows for both methods to be used in a complimentary fashion.

As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within the present disclosure.

The memory elements 704 may include one or more physical memory devices such as, for example, local memory 708 and one or more bulk storage devices 710. The local memory may refer to RAM or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

I/O devices depicted in FIG. 7 as an input device 712 and an output device 714, optionally, can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display. When used in a data communication system according to various embodiments of the present disclosure, e.g., in the data communication system 100, 200, 500, or 600, the input device 712 may be used to receive input, e.g., as provided by a user, and to configure the data communication system in accordance with the user input.

A network adapter 716 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

When used in a data communication system according to various embodiments of the present disclosure, e.g., in the data communication system 100, 200, 500, or 600, the network adapter 716 may be used to receive input from other systems, computer systems, remote network devices, and/or remote storage devices through intervening private or public networks, and to configure the data communication system in accordance with the received input. For example, the network adapter 716 may be configured to receive examples of input as described with reference to the input received by the input device 712 from the user, except that now it would be received from other systems, computer systems, remote network devices, and/or remote storage devices through intervening private or public networks.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the abstract, the drawings, or the claims.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer-readable storage medium (or multiple computer-readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer-readable medium or media may be transportable, such that the program or programs stored thereon may be loaded onto one or more different computers or other processors to implement various ones of the aspects described above. In some embodiments, computer-readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or digital signal processor (DSP)) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer-executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer-executable form (e.g., via an interpreter), or the source code may be converted (e.g., via a translator, assembler, or compiler) into a computer-executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

INTERPRETATION OF TERMS

All definitions, as defined and used herein, should be understood to control over dictionary definitions, definitions in documents incorporated by reference, and/or ordinary meanings of the defined terms. Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection combination, linking, or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

Example 1 provides a data communication system that includes an encoder (e.g., 104) to generate a Single Edge Nibble Transmission (SENT) protocol encoded output data and synchronization signal to be transmitted over a wired interface (e.g., 106); means to generate a readback data indicative of the SENT protocol encoded output data; means to compare data indicative of the SENT protocol encoded output data and data indicative of the readback data to identify a mismatch; and means to provide an indication of a mismatch. In a further example, the encoder may further generate a synchronization signal to be transmitted over the wired interface, the readback data may further be indicative of the synchronization signal, and comparison may include comparison of the synchronization signal transmitted over the wired interface and the synchronization signal in the readback signal.

Example 2 provides the data communication system according to example 1, where the means to generate the readback data includes a component configured to generate the readback data based on the SENT protocol encoded output data before the SENT protocol encoded output data is transmitted over the wired interface.

Example 3 provides the data communication system according to example 2, where the component includes a transistor (e.g., 108) to receive the SENT protocol encoded output data at a first terminal of the transistor and to provide a transistor output at a second terminal of the transistor, and the second terminal of the transistor is coupled to the wired interface and to the means to compare the data indicative of The SENT protocol encoded output data and the data indicative of the readback data.

Example 4 provides the data communication system according to example 3, where the first terminal of the transistor is a gate terminal, and the second terminal of the transistor is a drain terminal.

Example 5 provides the data communication system according to example 4, where the transistor further includes a third terminal coupled to a reference voltage (e.g., ground voltage).

Example 6 provides the data communication system according to any one of examples 3-5, where the means to compare the data indicative of the SENT protocol encoded output data and the data indicative of the readback data includes a first component (e.g., a buffer 110) to receive the transistor output at the second terminal of the transistor and to generate a first component output, a second component (e.g., an inverter 112) to receive the SENT protocol encoded output data provided to the first terminal of the transistor and to generate a second component output, and a third component (e.g., an XOR logic gate 114) to compare the first component output and the second component output to identify a mismatch.

Example 7 provides the data communication system according to example 6, where the first component is a buffer, the second component is an inverter, and the third component is a digital logic gate.

Example 8 provides the data communication system according to example 7, where the digital logic gate is an XOR function.

Example 9 provides the data communication system according to any one of examples 3-5, where the means to compare the data indicative of the SENT protocol encoded output data and the data indicative of the readback data includes a first component (e.g., a buffer 110 or other coupling element) to receive the transistor output at the second terminal of the transistor and to generate a first component output, a second component (e.g., a decoder 526) to decode data in the first component output and to generate a second component output, and a third component (e.g., a comparator 514) to compare the second component output and data based on which the encoder generated the SENT protocol encoded output data to identify a mismatch.

Example 10 provides the data communication system according to example 9, where the first component is a buffer or other coupling element, the second component is a decoder, and the third component is a comparator.

Example 11 provides the data communication system according to example 1, where the means to generate the readback data includes a component configured to generate the readback data based on a version of the SENT protocol encoded output data after the SENT protocol encoded output data was transmitted over the wired interface.

Example 12 provides the data communication system according to example 11, where the component includes a transistor (e.g., 108) to receive the version of the SENT protocol encoded output data after the SENT protocol encoded output data was transmitted over the wired interface at a first terminal of the transistor and to provide a transistor output at a second terminal of the transistor, the second terminal of the transistor is coupled to a further wired interface (e.g., 120), and the further wired interface is coupled to the means to compare the data indicative of the SENT protocol encoded output data and the data indicative of the readback data.

Example 13 provides the data communication system according to example 12, where the first terminal of the transistor is a gate terminal, and the second terminal of the transistor is a drain terminal.

Example 14 provides the data communication system according to example 13, where the transistor further includes a third terminal coupled to a reference voltage (e.g., ground voltage).

Example 15 provides the data communication system according to any one of examples 12-14, where the second terminal of the transistor is coupled to the further wired interface via an external network (e.g., 116).

Example 16 provides the data communication system according to any one of examples 12-15, where the means to compare the data indicative of the SENT protocol encoded output data and the data indicative of the readback data includes a first component (e.g., a buffer 110, or other coupling element) to receive data indicative of the transistor output from the further wired interface and to generate a first component output, a second component (e.g., an inverter 112) to receive the SENT protocol encoded output data before the SENT protocol encoded output data is sent over the wired interface and to generate a second component output, and a third component (e.g., an XOR logic gate 114) to compare the first component output and the second component output to identify a mismatch.

Example 17 provides the data communication system according to example 16, where the first component is a buffer, the second component is an inverter, and the third component is a digital logic gate.

Example 18 provides the data communication system according to example 17, where the digital logic gate is an XOR gate.

Example 19 provides the data communication system according to any one of examples 12-15, where the means to compare the data indicative of the SENT protocol encoded output data and the data indicative of the readback data includes a first component (e.g., a buffer 110) to receive the transistor output at the second terminal of the transistor and to generate a first component output, a second component (e.g., a decoder 526) to decode data in the first component output and to generate a second component output, and a third component (e.g., a comparator 514) to compare the second component output and data based on which the encoder generated the SENT protocol encoded output data to identify a mismatch.

Example 20 provides the data communication system according to example 19, where the first component is a buffer, the second component is a decoder, and the third component is a comparator.

Example 21 provides the data communication system according to any one of the preceding examples, where the encoder is a SENT protocol encoder module, and the wired interface is a SENT protocol interface.

Example 22 provides the data communication system according to any one of the preceding examples, further including means to retransmit data in which a mismatch was identified.

Example 23 provides the data communication system according to example 22, further including means to set how many times the data is to be retransmitted.

Example 24 provides the data communication system according to any one of the preceding examples, further including means to indicate a detected mismatch by corrupting the current message CRC.

Example 25 provides the data communication system according to any one of the preceding examples, further including means to indicate a detected mismatch by corrupting the next message CRC.

Example 26 provides the data communication system according to any one of the preceding examples, further including means to indicate a detected mismatch by setting a flag in the current message.

Example 27 provides the data communication system according to any one of the preceding examples, further including means to indicate a detected mismatch by setting a flag in the following message.

Example 28 provides the data communication system according to any one of the preceding examples, further including means to indicate a detected mismatch by halting message transmission.

Example 29 provides the data communication system according to any one of the preceding examples, further including means to indicate a detected mismatch by pausing message transmission.

Example 30 provides the data communication system according to any one of the preceding examples, further including means to indicate a detected mismatch by altering the sync pulse timing.

Example 31 provides the data communication system according to any one of the preceding examples, further including means to indicate a detected mismatch by altering the content of data to be transmitted, e.g., generating invalid nibble content.

Example 32 provides the data communication system according to any one of the preceding examples, further including means to indicate a detected mismatch by altering the content of data to be transmitted, e.g., generating invalid status content.

Example 33 provides the data communication system according to any one of the preceding examples, further including means to indicate a detected mismatch by signaling via a separate signal, e.g., using a secondary signal path or output pin.

Example 34 provides the data communication system according to any one of the preceding examples, further including means to indicate a detected mismatch by signaling via transmitting a specific predetermined pattern on to the bus e.g., a 50% duty cycle fora predetermined period of time.

The invention claimed is:

1. A data communication system, comprising:
    an encoder configured to generate a Single Edge Nibble Transmission (SENT) protocol encoded output data and synchronization signal to be transmitted over a wired interface;
    first circuitry configured to generate a readback data from the wired interface indicative of the SENT protocol encoded output data before a transmission of the SENT protocol encoded output data over the wired interface;
    second circuitry configured to compare data indicative of the SENT protocol encoded output data from the encoder to be transmitted over the wired interface and data indicative of the readback data from the wired interface before the transmission of the SENT protocol encoded output data over the wired interface to identify a mismatch; and
    third circuitry configured to provide an indication of the mismatch.

2. The data communication system according to claim 1, wherein the first circuitry includes a component to generate the readback data based on the SENT protocol encoded output data before the SENT protocol encoded output data is transmitted over the wired interface.

3. The data communication system according to claim 2, wherein:
    the component includes a transistor to receive the SENT protocol encoded output data at a first terminal of the transistor and to provide a transistor output at a second terminal of the transistor, and
    the second terminal of the transistor is coupled to the wired interface and to the second circuitry.

4. The data communication system according to claim 3, wherein:
    the first terminal of the transistor is a gate terminal,
    the second terminal of the transistor is a drain terminal, and
    the transistor further includes a source terminal coupled to a reference voltage.

5. The data communication system according to claim 3, wherein the second circuitry includes:
    a first component to receive the transistor output at the second terminal of the transistor and to generate a first component output,
    a second component to receive the SENT protocol encoded output data provided to the first terminal of the transistor and to generate a second component output, and
    a third component to compare the first component output and the second component output to identify the mismatch.

6. The data communication system according to claim 5, wherein:
    the first component is a coupling element,
    the second component is a first digital logic gate, and
    the third component is a second digital logic gate.

7. The data communication system according to claim 3, wherein the second circuitry includes:
    a first component to receive the transistor output at the second terminal of the transistor and to generate a first component output,
    a second component to decode data in the first component output and to generate a second component output, and
    a third component to compare the second component output and data based on which the encoder generated the SENT protocol encoded output data to identify the mismatch.

8. The data communication system according to claim 7, wherein:
    the first component is a coupling element,
    the second component is a decoder, and
    the third component is a comparator.

9. The data communication system according to claim 1, wherein the first circuitry includes a component to generate the readback data based on a version of the SENT protocol encoded output data after the SENT protocol encoded output data was transmitted over the wired interface.

10. The data communication system according to claim 9, wherein:
    the component includes a transistor to receive the version of the SENT protocol encoded output data after the SENT protocol encoded output data was transmitted over the wired interface at a first terminal of the transistor and to provide a transistor output at a second terminal of the transistor,
    the second terminal of the transistor is coupled to a further wired interface, and
    the further wired interface is coupled to the second circuitry.

11. The data communication system according to claim 10, wherein:
    the first terminal of the transistor is a base terminal,
    the second terminal of the transistor is a collector terminal, and
    the transistor further includes an emitter terminal coupled to a reference voltage.

12. The data communication system according to claim 10, wherein the second circuitry includes:
    a first component to receive data indicative of the transistor output from the further wired interface and to generate a first component output,
    a second component to receive the SENT protocol encoded output data before the SENT protocol encoded output data is sent over the wired interface and to generate a second component output, and
    a third component to compare the first component output and the second component output to identify the mismatch.

13. The data communication system according to claim 10, wherein the second circuitry includes:
    a first component to receive the transistor output at the second terminal of the transistor and to generate a first component output,
    a second component to decode data in the first component output and to generate a second component output, and
    a third component to compare the second component output and data based on which the encoder generated the SENT protocol encoded output data to identify the mismatch.

14. The data communication system according to claim 1, further comprising circuitry configured to retransmit data in which the mismatch was identified.

15. The data communication system according to claim 14, further comprising circuitry configured to set how many times the data is to be retransmitted.

16. The data communication system according to claim 1, wherein providing the indication of the mismatch includes corrupting a cyclic redundancy check of a current message or a next message.

17. The data communication system according to claim 1, wherein providing the indication of the mismatch includes setting a flag in a current message or a next message.

18. The data communication system according to claim 1, wherein providing the indication of the mismatch includes halting message transmission.

19. The data communication system according to claim 1, wherein providing the indication of the mismatch includes pausing message transmission.

20. The data communication system according to claim 1, wherein providing the indication of the mismatch includes altering a synchronization pulse timing.

* * * * *